United States Patent
Neumann

(10) Patent No.: US 8,963,471 B1
(45) Date of Patent: Feb. 24, 2015

(54) PULSE WIDTH MODULATION DC MOTOR CONTROLLER

(75) Inventor: Charles A. Neumann, Lake Forest, CA (US)

(73) Assignee: Western Digital Technologies, Inc., Irvine, CA (US)

(*) Notice: Subject to any disclaimer, the term of this patent is extended or adjusted under 35 U.S.C. 154(b) by 84 days.

(21) Appl. No.: 13/434,759

(22) Filed: Mar. 29, 2012

(51) Int. Cl.
 *G05B 7/00* (2006.01)
 *H02P 7/29* (2006.01)

(52) U.S. Cl.
 USPC ............. 318/599; 338/48; 338/321; 338/322; 318/811; 318/667; 318/674; 318/400.26; 318/294

(58) Field of Classification Search
 None
 See application file for complete search history.

(56) References Cited

U.S. PATENT DOCUMENTS

| | | | | |
|---|---|---|---|---|
| 3,564,289 A | * | 2/1971 | Smith-Saville | 327/590 |
| 3,673,467 A | * | 6/1972 | Eisenreich | 361/172 |
| 3,836,790 A | * | 9/1974 | Becker | 327/74 |
| 4,626,750 A | * | 12/1986 | Post | 318/139 |
| 5,261,025 A | | 11/1993 | Post et al. | |
| 5,331,479 A | * | 7/1994 | Madsen | 360/68 |
| 5,341,278 A | * | 8/1994 | Brooks | 363/16 |
| 5,942,866 A | | 8/1999 | Hsieh | |
| 5,952,798 A | | 9/1999 | Jones et al. | |
| 6,008,603 A | | 12/1999 | Jones et al. | |
| 6,828,748 B2 | | 12/2004 | Horng et al. | |
| 7,193,377 B2 | | 3/2007 | Fung | |
| 2004/0165869 A1 | | 8/2004 | Horng et al. | |
| 2005/0041438 A1 | * | 2/2005 | Chen et al. | 363/17 |
| 2010/0066279 A1 | * | 3/2010 | Frankel et al. | 318/379 |
| 2010/0121277 A1 | * | 5/2010 | Fehr et al. | 604/151 |
| 2010/0127651 A1 | * | 5/2010 | Ko et al. | 318/400.26 |

* cited by examiner

*Primary Examiner* — Eduardo Colon Santana
*Assistant Examiner* — Devon Joseph

(57) ABSTRACT

A controller for a DC motor comprises an output switching element configured to couple to the DC motor; an input switching element coupled to the output switching element; a pulse width modulated (PWM) signal coupled to a control terminal of the input switching element and a supply voltage applied to the output switching element. A resistive-capacitive (RC) network may be coupled to a control terminal of the output switching element, with the RC network being configured to integrate the PWM signal into a DC voltage. A first resistive network may be configured to set a bias for the output switching element when the input switching element is turned off, and a second resistive network may be configured to set the bias for the output switching element when the input switching element is turned on, such that the controller is effective to provide zero-to-full supply voltage control to the DC motor.

16 Claims, 3 Drawing Sheets

PULSE WIDTH MODULATION DC MOTOR CONTROLLER

BACKGROUND

In many enclosures for electronic devices such as computers, storage devices, game consoles or audio-visual equipment, the heat generated by the electronic components must be vented to the exterior of the enclosure. Typically, one or more direct current (DC) fans are used for that purpose. When the temperature within the enclosure reaches a given threshold, the fan is commanded to turn on at full speed. This can result in audible noise that may become bothersome to the user.

Some implementations sense the temperature within the enclosure and modulate the speed of the fan according to the sensed temperature. This can result in a quieter fan operation profile. However, such fan speed modulation is accomplished using a costly fan speed control integrated circuit (IC) that can be overly sensitive to small changes in the duty cycle of the pulse width modulation (PWM) input control signal. What are needed, therefore, are DC motor controllers that are less costly and that nevertheless provide an increased dynamic range and a fine control of the speed of the fan.

DETAILED DESCRIPTION

The DC motor controller according to one embodiment eliminates the need for an expensive DC motor speed control IC, while reducing the size of the integrating capacitors. One embodiment also eliminates the need for a current limiting resistor in series with the output transistor, thereby allowing the full or nearly the full supply voltage to be available to the DC motor, while providing increased dynamic range and a reduced sensitivity to DC motor load variations.

Figure 1:
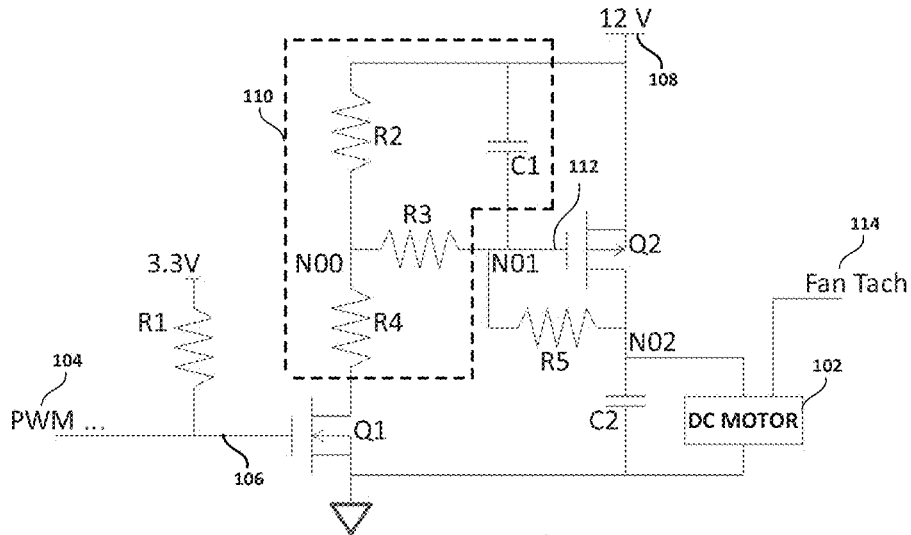
FIG. 1 is a circuit diagram of a controller for a DC motor, according to one embodiment.
Figure 2:
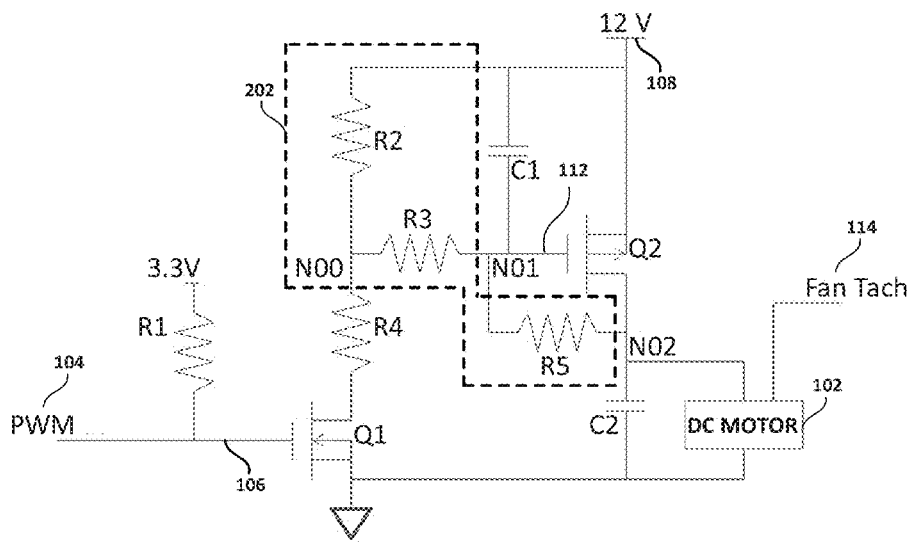
FIG. 2 is a circuit diagram of a controller for a DC motor, according to one embodiment.
Figure 3:
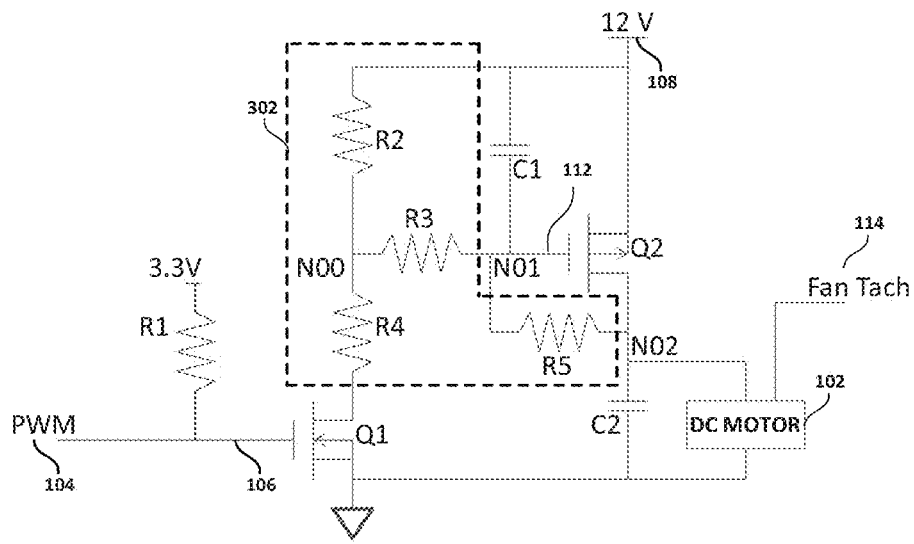
FIG. 3 is a circuit diagram of a controller for a DC motor, according to one embodiment.

FIG. 1 is a circuit diagram of a controller for a DC motor, according to one embodiment. As shown, the circuit of FIG. 1 comprises a controller for a DC motor that comprises an output switching element Q2 that is configured to couple to a DC motor 102. As shown in FIGS. 1-3, the DC motor 102 may comprise a fan. A fan tachometer 114 may be coupled to the fan 102. An input switching element Q1 may be coupled to the output switching element Q2, through one or more components, as shown in FIGS. 1-3. A PWM signal 104 may be coupled to the control terminal 106 of the input switching element Q1. A supply voltage Vcc 108 may be applied to the output switching element Q2. According to one embodiment, the supply voltage may comprise a 12 V supply voltage. A resistive-capacitive (RC) network 110 may be coupled to the input switching element Q1 and to the control terminal 112 of the output switching element Q2. According to one embodiment, the RC network 110 may be configured to integrate the PWM signal 104 into a DC voltage. That is, the input switching element Q1 may be configured to carry out level translation of the PWM signal 104 from the 3.3 V across resistor R1 to the supply voltage 108, with an output of the first switching element Q1, along with the RC network 110, integrating the PWM signal 104 into a DC voltage. In operation, resistors R2, R3 and R4 limit the current that flows into a first energy storing device C1, which charges C1 accordingly. C1, as shown in FIGS. 1-3, may be coupled between the supply voltage 108 and the control terminal 112 of the output switching element Q2. First energy storing device C1 charges to a voltage level that may be loosely thought of as the average, over time, of the duty factor (square wave OFF time/square wave ON time, expressed as a percentage) of the PWM signal 104. C1 is preferably chosen such that the time constant thereof is much larger than the period of the PWM signal 104. For example, C1 may be selected to be a 0.1 uf, 16V capacitor.

As shown in FIG. 2, a first resistive network 202 (e.g., resistors R2, R3 and R5) may be provided and configured to set a bias for the output switching element Q2 when the input switching element Q1 is turned OFF. As shown in FIG. 3, a second resistive network 302 (e.g., resistors R2, R4, R3 and R5) may be provided and configured to set the bias for the output switching element Q2 when the input switching element Q1 is turned ON.

According to one embodiment, the input switching element Q1 may comprise a first transistor, which may be a Metal Oxide Semiconductor Field Effect Transistor (MOSFET), and the output switching element Q2 may comprises a second transistor that may also be a MOSFET. For example, Q1 may comprise an n-type enhancement MOSFET and Q2 may comprise a p-type enhancement MOSFET.

In operation, when the PWM signal 104 is at a logical low, the voltage at the gate of Q1 is insufficient to turn Q1 ON. Therefore, Q1 is OFF when the PWM signal 104 is at a logical low, meaning that it does not conduct current between its drain and source, which is shown in FIG. 2 as being tied to a reference voltage, such as ground. When Q1 is OFF, the supply voltage may be seen across the drain and source terminals thereof, as the drain of Q1 has been pulled up to the voltage supply level by resistors R2 and R4. When Q1 is OFF, there is no voltage across R2 and R4, and no current flowing through R3. The gate of Q2, therefore, remains tied to the supply voltage through C1. As Q2 is a p-channel MOSFET according to one embodiment, Q2 remains OFF and the voltage at node N02 is zero, meaning that the DC motor (e.g., fan 102) stays OFF. As the gate of Q2 is tied to the supply voltage, the supply voltage (in the example being developed herewith, 12 V) also shows up across negative feedback resistor R5, which may be coupled between the drain (the node N02) and the gate (the node N01) of Q2. However, as the first resistive network 202 forms a voltage divider between R5, R3 and R2, there is a little more than 0 V across the gate of Q2.

In fact, according to one embodiment, the first resistive network 202 forms a bias point for Q2 such that, when the PWM signal 104 is at a logical low, Q2 (being a p-channel MOSFET according to one embodiment) is OFF. However, for purposes of dynamic range, the gate of Q2 should not be at 0, but should have a non-zero gate-to-source voltage (Vgs) that is less than the threshold voltage (Vt) for Q2 that would otherwise turn Q2 ON. Therefore, the voltage divider formed by R2, R4 and R3 may be selected such that the gate of Q2, when Q1 is OFF, sees a non-zero voltage that is less than its threshold voltage. This non-zero voltage at NO1 should be selected to ensure that Q2 remains OFF, given the selected supply voltage, irrespective of any manufacturing variations of the threshold voltage of Q2.

When the PWM signal 104 is at a logical high, the gate of Q1 is pulled to a predetermined voltage selected to be at least as high as the threshold voltage of Q1. In the example being developed herewith, that predetermined voltage is 3.3V. Therefore, when the PWM signal 106 is at a logical high, the gate of Q1 is pulled higher than Q1's threshold voltage and Q1 turns ON. As the channel between the drain and the source of Q1 is fully conducting, there is 0 V across Q1 and 12 V across R2 and R4. Current flows through R3, raising N01 at least above the threshold voltage for Q2, turning Q2 ON. As Q2 is ON, there is 0 V across its source and drain terminals and nearly the full supply voltage 108 appears across the DC motor 102, thereby turning it on full speed. A decoupling capacitor C2 may be coupled across the DC motor 102. Capacitor C2 may be chosen, for example, to attenuate high frequency (e.g., noise) components that may be present at N02. For example, the time constant of C2 may be selected to be, for example, about two orders of magnitude longer than the highest frequency expected to be encountered across the DC motor 102. For example, C2 may be selected to be a 22 uF, 25V capacitor.

As shown in FIG. 2, the first resistive network 202 may comprise a feedback resistor R5 between Q2's drain (N02) and Q2's gate (N01). With Q2 fully ON, N02 is pulled close to the supply voltage and the resistive network comprising R5 and R3 in parallel with R2 is present, as R4 is pulled to ground, due to the ON status of Q1. Therefore, when the PWM signal 104 is at a logical low, the first resistive network 202 (R2, R3 and R5 in FIG. 2) sets the bias for Q2 when Q1 is turned OFF and when the PWM signal 104 is at a logical high, the second resistive network 302 (R2, R3, R4 and R5 in FIG. 3) sets the bias for Q2 when the Q1 is turned ON. The values of the circuit elements, according to one embodiment, may be selected such that the voltage applied to the gate of Q2 varies between a minimum gate voltage specified for the transistor Q2 and a maximum gate voltage specified for transistor Q2. In this manner, the bias for Q2 is set to enable a maximum dynamic range and full control over the operating band of the DC motor, thereby making the controller of FIGS. 1-3 effective to provide zero-to-full or zero-to-near full supply voltage control to the DC motor 102.

When Q2 is less than fully ON, Q2 acts like a voltage controlled resistor where the current flowing through the channel between the drain and source thereof is proportional to the voltage at N01. That is, when C1 is charged to some intermediate value at which N01 is between a gate voltage in which Q2 is entirely OFF and a gate voltage at which Q2 is fully ON, R5 acts as a stabilizer, enabling such intermediate voltages at N02 by suitably decreasing Q2's sensitivity to small variations in gate voltage. In this manner, the presence of R5 enables a fine control over a range of voltages to the DC motor 102. According to one embodiment, given a supply voltage of 12V and when the DC motor is ON, N01 may vary between about 4.5V to about 12V. As the turn-on voltages may differ across even the same DC motors, a microcontroller may be utilized to determine the minimum voltage required to overcome the inertia of the rotor of the DC motor 102 and spin up DC motor and the voltage range at N01 set accordingly.

According to one embodiment, the values of the resistors R2-R5 are selected with the above-detailed functionality in mind, and may be selected so as to account for manufacturing variabilities in, e.g., the minimum threshold voltage of the transistor Q2. As the gain of Q2 may be quite large (e.g., on the order of 10 amps per volt) and the DC motor may draw on the order of 100 mA (as is the case with some fans, for example), R5 is used to lower the gain of Q2, decreasing its sensitivity to small changes in the voltage across C1, so as to enable the above-mentioned fine control over a predetermined range of voltages at N02. Note that Q2 does not operate as a charge pump to charge up C2 and does not require a current limiting resistor at its drain, which would be very load sensitive and would not allow the full zero to supply voltage range to be selectively applied to the load; namely the DC motor 102.

According to one embodiment, the supply voltage (Vcc) may be selected to be 12V and Q2 may be selected to be a 30V P-Channel MOSFET such as available from Alpha & Omega Semiconductor, part No. AO3407. This transistor has, according to the manufacturer's datasheet, a minimum threshold voltage Vt of 1.4V and a maximum threshold voltage of 2.4V, with a typical value at about 2.4V. According to one embodiment, when Q1 is OFF, the first resistive network 202 (FIG. 2) formed by R2, R3, and R5 (with one end of R5 tied to ground, because Q2 is OFF), will bias the gate of Q2 at a voltage slightly lower than the minimum value of Vt, such as for example, 1.3V (Vgs-off). The value of R3 may be based on R2's value, and R5's value may be based on the value of R2 and of R3. Therefore, R2 may be selected to be of moderate value that will not dissipate any significant power, and will not force the other values in the circuit to be so high in value that leakage from various components becomes a significant source of errors. For example, the value of R2 may be selected to be about 10 kΩ.

If the PWM signal is at a logical low, Q2 should be OFF, meaning that its gate voltage at N01 should be at or below Vgs-off or 1.3V. For example, R3 may be selected to be about three times the value of R2; namely 30 kΩ. R5 may be selected with Q1 and Q2 being OFF (no current flowing between their respective sources and drains). Indeed, the divider formed by R2, R3 and R5 and through the DC motor 102 may set the value of R5. Therefore, R5=(Vcc−Vgs-off)−R2+R3)/Vgs-off=329.2308 kΩ. Therefore, a standard 332 KΩ resistor may be selected in the embodiment developed herewith.

Finally, R4 may be selected to set up the ON voltage of the circuit. Assuming Q1 is ON all of the time (100% duty cycle), the voltage at N00 will be slightly more than the maximum value of Vt, from the Q2 datasheet, summarized above. That is, the value of Vgs-on=2.5 V. For example, the value of R4 may be selected to be 33.1 kΩ, although a somewhat lower value moves the "ON" bias point higher in voltage, allowing more margin.

Figure 4:
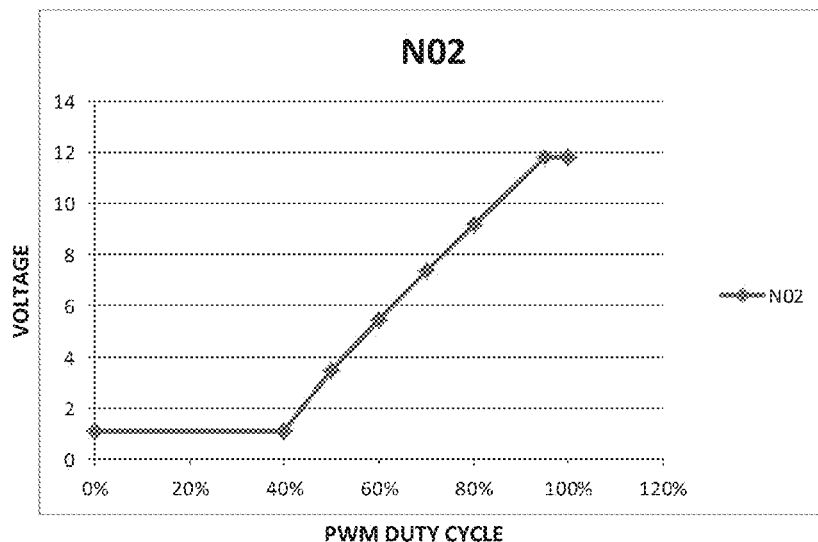
FIG. 4 is a graph showing the voltage vs. PWM duty cycle characteristics of the DC motor controller of FIGS. 1-3, according to one embodiment.

FIG. 4 is a graph showing the voltage at node N02 vs. the duty cycle of the PWM signal 104 of the controller of FIGS. 1-3, according to one embodiment. As shown therein, until the duty cycle of the PWM signal 104 exceeds 40%, the voltage at N01 is insufficient to turn on Q2. That is, until the duty cycle of the PWM exceeds 40%, the voltage at node N01 is less than Q2's minimum threshold voltage Vt of about 1.3V, meaning that Q2 remains OFF. When the PWM signal 104 exhibits a duty cycle exceeding about 40%, Q2 turns on, as C1 has pulled N01 above Q2's threshold voltage Vt. As can be seen from the nearly linear N02 voltage—PWM duty cycle characteristics of FIG. 4, between about 40% duty cycle and 100% duty cycle, the voltage at N02 varies nearly linearly with increases in the duty cycle of the PWM signal 104. This nearly linear characteristic enables a fined-grained and proportional control of the speed at which the DC motor 102 is driven, based upon the duty cycle of the PWM signal 104. Indeed, the controller of FIGS. 1-3 provides a wider dynamic range for pulse-width-modulation to DC motor speed control. This enables a smooth control of the speed of the DC motor 102. According to one embodiment, the DC motor 102 may comprise a fan and the controller of FIGS. 1-3 enables a very fine and smooth control of the fan and allows products incorporating the same to exhibit very low fan noise, as the fan does not come on full speed. This modulation of the fan speed results in forced air cooling that is less noticeable and objectionable to the user. Embodiments also obviate the need for a dedicated PWM control IC, providing a non-trivial per-unit cost saving.

Figure 5:
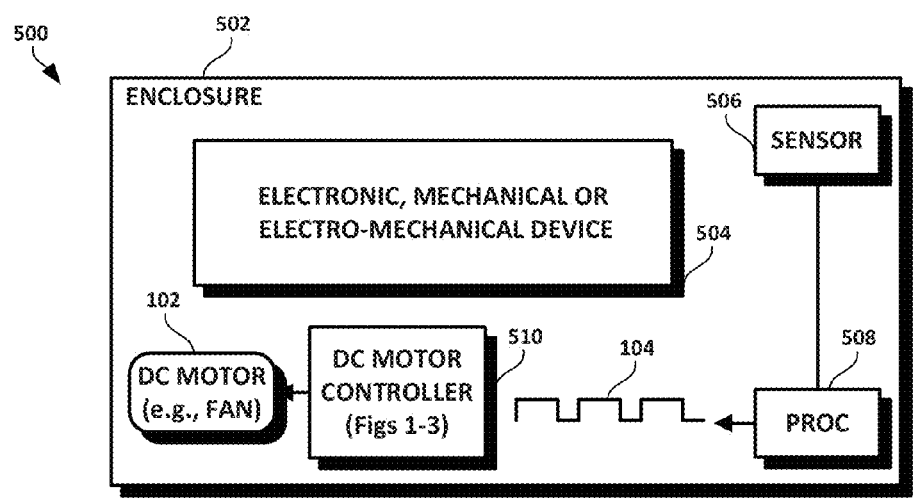
FIG. 5 is a block diagram of a device comprising a controller for a DC motor, according to one embodiment.

FIG. 5 is a block diagram of a device 500 comprising a controller for a direct current (DC) motor, according to one embodiment. As shown, the device 500 may include an enclosure 502. The enclosure 502 may comprise an electronic device, mechanical device or an electro-mechanical device 504 or any device, mechanical or electro-mechanical mechanism or assembly. A sensor 506 may be provided, for example, within the enclosure 506. It is understood that the sensor may also be provided outside of the enclosure 502. According to one embodiment, the sensor 506 may comprise a heat sensor, although the sensor 506 may instead sense other characteristics, such as illumination, humidity, vibrations or the like instead of or in addition to heat. The sensor 506 may be coupled to a processor or controller 508 that is configured to receive an output of the sensor 506 and to generate a pulse-width modulated signal 104. Alternatively, the sensor 506 may receive data from a source internal to the device 500 or external thereto and generate an output signal based on the received data. The sensor 506 may, therefore, comprise any structure or functionality that reacts to some logical or physical quantity or characteristic. The PWM signal 104 may be coupled to a DC motor controller 510, one embodiment of which is shown in FIGS. 1-3. Finally, the device 502 may comprise (or be coupled to) a DC motor 102. It is to be understood that the DC motor need not be within the enclosure 502. According to one embodiment, the DC motor 102 comprises a fan. According to one embodiment, the device 504 may comprise a data storage device such as a disk drive, a solid state storage device or a hybrid storage device. According to one embodiment, the sensor 506 comprises a heat sensor and the DC motor 102 comprises a fan disposed within the enclosure and configured to force air from the external environment into the enclosure 502 or to force air from the environment into the enclosure 502, to generate a positive pressure therein, to help the internal components thereof to dissipate heat generated within the enclosure more efficiently.

While certain embodiments of the inventions have been described, these embodiments have been presented by way of example only, and are not intended to limit the scope of the inventions. Indeed, the novel DC motor controllers, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures (such as, for example, the switching elements Q1 and Q2 and the specific discrete elements of the circuit of FIGS. 1-3) may differ from those shown in the figures. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A controller for a direct current (DC) motor, the controller comprising:
    an output switching element configured to couple to the DC motor;
    an input switching element coupled to the output switching element;
    a pulse width modulated (PWM) signal coupled to a control terminal of the input switching element;
    a supply voltage applied to the output switching element;
    a resistive-capacitive (RC) network coupled to a control terminal of the output switching element, the RC network being configured to integrate the PWM signal into a DC voltage;
    a first resistive network configured to set a bias for the output switching element when the input switching element is turned off; and
    a second resistive network, connected to the input switching element and to the first resistive network, configured such that substantially no current flows therethrough when the input switching element is turned off and configured to, together with the first resistive network, set the bias for the output switching element when the input switching element is turned on, such that the controller is effective to provide zero-to-full supply voltage control to the DC motor.

2. The controller of claim 1, wherein the DC motor comprises a fan.

3. The controller of claim 1, wherein the input switching element comprises a first transistor and the output switching element comprises a second transistor.

4. The controller of claim 3, wherein the first transistor comprises a Metal Oxide Semiconductor Field Effect Transistor (MOSFET) and wherein the second transistor comprises a MOSFET.

5. The controller of claim 4, wherein the first transistor comprises an n-type enhancement MOSFET and wherein the second transistor comprises a p-type enhancement MOSFET.

6. The controller of claim 1, wherein the RC network comprises a first energy storing device coupled between the supply voltage and a control terminal of the output switching element.

7. The controller of claim 1, wherein the first resistive network comprises a voltage divider coupled between the supply voltage and the control terminal of the output switching element.

8. The controller of claim 1, wherein the second resistive network comprises a resistive element coupled between an output terminal of the output switching element and the control terminal thereof.

9. A device, comprising:
    a DC motor;
    a sensor configured to output a sensor output signal;
    a processor coupled to the sensor, the processor being configured to output a pulse-width modulated (PWM) control signal based on the sensor output signal, and
    a controller, the controller comprising:
    an output switching element coupled to the DC motor;
    an input switching element having a control terminal coupled to the PWM control signal, the input switching element being further coupled to a control terminal of the output switching element;
    a supply voltage applied to the output switching element;

a resistive-capacitive (RC) network coupled to the control terminal of the output switching element, the RC network being configured to integrate the PWM signal into a DC voltage;

a first resistive network configured to set a bias for the output switching element when the input switching element is turned off; and a second resistive network, connected to the input switching element and to the first resistive network, configured such that substantially no current flows therethrough when the input switching element is turned off and configured to, together with the first resistive network, set the bias for the output switching element when the input switching element is turned on, such that the controller is effective to provide zero-to-full supply voltage control to the DC motor.

10. The device of claim 9, wherein the DC motor comprises a fan.

11. The device of claim 9, wherein the input switching element comprises a first transistor and the output switching element comprises a second transistor.

12. The device of claim 11, wherein the first transistor comprises a Metal Oxide Semiconductor Field Effect Transistor (MOSFET) and wherein the second transistor comprises a MOSFET.

13. The device of claim 12, wherein the first transistor comprises an n-type enhancement MOSFET and wherein the second transistor comprises a p-type enhancement MOSFET.

14. The device of claim 9, wherein the RC network comprises a first energy storing device coupled between the supply voltage and the control terminal of the output switching element.

15. The device of claim 9, wherein the first resistive network comprises a voltage divider coupled between the supply voltage and the control terminal of the output switching element.

16. The device of claim 9, wherein the second resistive network comprises a resistive element coupled between an output terminal of the output switching element and the control terminal thereof.

* * * * *